United States Patent
Nevernov et al.

(10) Patent No.: US 8,208,611 B2
(45) Date of Patent: Jun. 26, 2012

(54) SYSTEM FOR REMOTE CONTROL OF APPARATUSES, IN PARTICULAR OF INDUSTRIAL APPARATUSES

(75) Inventors: Igor Nevernov, Cologno Monzese (IT); Mauro Macchi, Monza (IT)

(73) Assignee: Your Voice S.p.A., Milan (IT)

( * ) Notice: Subject to any disclaimer, the term of this patent is extended or adjusted under 35 U.S.C. 154(b) by 960 days.

(21) Appl. No.: 12/089,357

(22) PCT Filed: Sep. 29, 2006

(86) PCT No.: PCT/IB2006/002720
§ 371 (c)(1), (2), (4) Date: Sep. 9, 2008

(87) PCT Pub. No.: WO2007/042881
PCT Pub. Date: Apr. 19, 2007

(65) Prior Publication Data
US 2010/0284523 A1 Nov. 11, 2010

(30) Foreign Application Priority Data
Oct. 7, 2005 (IT) .................................. MI05A1883

(51) Int. Cl.
*H04M 11/00* (2006.01)
(52) U.S. Cl. ............ 379/93.01; 379/102.03; 379/102.05
(58) Field of Classification Search ................ 379/93.01, 379/90.01, 102.03, 102.05, 102.06; 340/286.02, 340/506, 12.83, 3.1, 517, 521, 524, 539.1, 340/539.14, 539.18, 6–1, 7.2
See application file for complete search history.

(56) References Cited

U.S. PATENT DOCUMENTS

| 5,951,666 A | 9/1999 | Ilting et al. | |
| 6,211,782 B1* | 4/2001 | Sandelman et al. | 340/506 |
| 2004/0100650 A1* | 5/2004 | Landau et al. | 358/1.14 |
| 2005/0197727 A1* | 9/2005 | Ogushi et al. | 700/108 |

FOREIGN PATENT DOCUMENTS

| CH | 694 194 A5 | 8/2004 |
| DE | 100 38 860 A1 | 2/2002 |

OTHER PUBLICATIONS

Kriesel, W. et al., "ASI IM Ueberblick", Aktuator Sensor Interface Fuer Die Automation, 1994, pp. 11-60, XP002062938, pp. 49-59; English translation of section 1.1 on pp. 11-13.

* cited by examiner

*Primary Examiner* — Melur Ramakrishnaiah
(74) *Attorney, Agent, or Firm* — Pearne & Gordon LLP

(57) ABSTRACT

A system for control of apparatuses, in particular of industrial apparatuses, comprising a plurality of interfaces (20), each dedicated to a connection with a respective apparatus (10) to be monitored, and a processing unit (40) to control the apparatuses (10); the processing unit (40) is provided with first receiving means (41) to receive at least one data item from an apparatus (10), a first selection block (42) to select one or more addressees, depending on the received data item, a second selection block (43) to select one or more communication channels (50) for connection with said addressees, and first transmission means (44) to send at least one notification signal representative of the received data to the addressees through the selected communication channel/channels (50).

14 Claims, 2 Drawing Sheets

SYSTEM FOR REMOTE CONTROL OF APPARATUSES, IN PARTICULAR OF INDUSTRIAL APPARATUSES

The present invention relates to a system for remote control of apparatuses, in particular of industrial apparatuses.

It is known that the industrial-type machinery is equipped with one or more actuators, one or more sensors, and a controller to regulate operation of these devices.

In more detail, the actuators' task is to perform predetermined functions of the mechanical or electro-mechanical type (actuation of working members, shifting of finished or semi-finished products, for example, and so on); the sensors detect predetermined parameters relating to operation of the machinery (e.g. working speed, number of worked or shifted pieces, electric power consumption, temperature of regions particularly subject to overheating, etc.).

The controller typically carries out local adjustment of the actuators, supplying the latter with suitable command signals for execution of the desired operations and at the input receives data detected by the different sensors, so that adjustment of the machine operation can be carried out depending on the true conditions of the machine itself.

In different industrial fields it is necessary for the different machinery to be able to be remotely monitored, so that the charged operators, even if they are at a geographically remote place with respect to the apparatus, can receive notification or warning signals, should a failure or merely an anomaly in the machine operation occur, and can also send command, adjustment and/or setting signals to the machinery itself. In this way therefore situations of malfunction of the machine can be dealt with, as well as problems that can result therefrom, without the physical presence of an operator close to the apparatus in question being required.

In more detail, it is required that, depending on the type and urgency of the data to be communicated, operators having tasks and experience different from each other should be informed about any problem of the machine through employment of suitable selected communication channels.

In addition to the above, it is to be pointed out that generally communication between the remote operator and the machinery to be controlled makes use of an interface positioned close to the machinery and designed to carry out signal exchange between the machine controller and the communication device used by the operator.

Presently, the interfaces of known type are connected to the local controller through a series connection or a parallel connection.

Since in series connection an unavoidable "arrangement" of the different data that must be sequentially transmitted occurs, an intrinsic reduction in the communication speed is caused, because it is necessary to wait for the whole data queue to arrive at destination in order to be able to take advantage of the full information.

Parallel connection, on the contrary, puts some important limits to the amount of information that can be transmitted, due to the fact that this amount is defined by the number of channels used for transmission; therefore in order to send and receive important data amounts, use of a high number of channels is required, which makes the whole connection structure complicated, expensive and difficult to handle.

The present invention aims at providing a system for remote control of apparatuses, in particular industrial apparatuses, enabling communication between the operators and the local controller associated with the machinery to be optimised.

In more detail, it is an aim of the invention to make available a system for remote control of apparatuses that is able to inform the operator who is really concerned with the information about an anomaly or a failure, through the most appropriate connection channel or channels.

It is a further aim of the invention to provide a system for remote control of apparatuses offering an optimal compromise between the manufacture complexity and the communication speed of the connection between the local controller mounted on the apparatus and the interface associated therewith.

The foregoing and further aims are substantially achieved by a system for remote control of apparatuses, in particular industrial apparatuses, in accordance with the features recited in the appended claims.

Further features and advantages will become more apparent from the detailed description of a preferred but not exclusive embodiment of the control system in accordance with the invention. This description is taken hereinafter with reference to the accompanying drawings, given by way of non-limiting example, in which.

Figure 1:
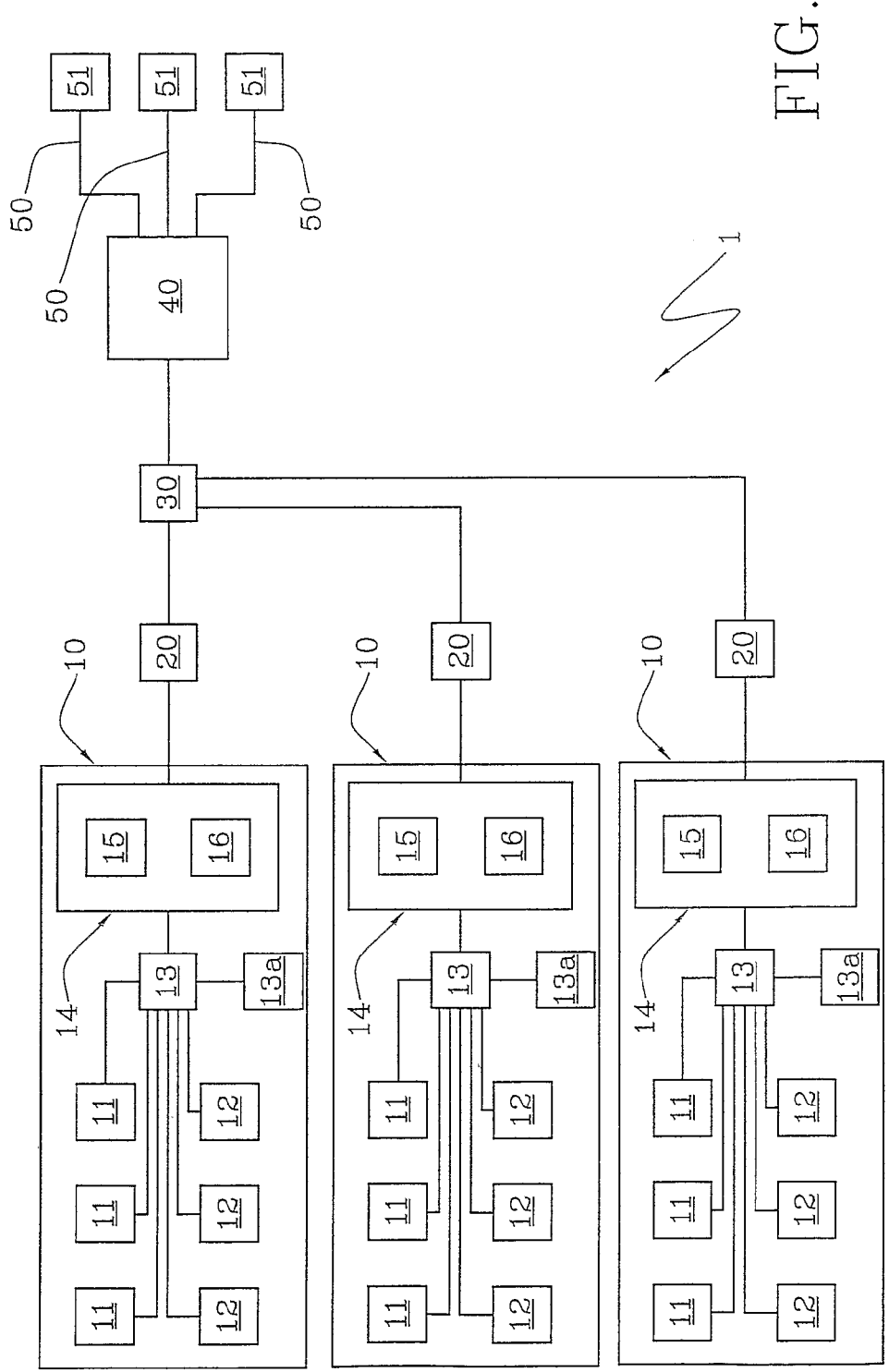
FIG. 1 is a block diagram of the system in accordance with the invention.
Figure 2:
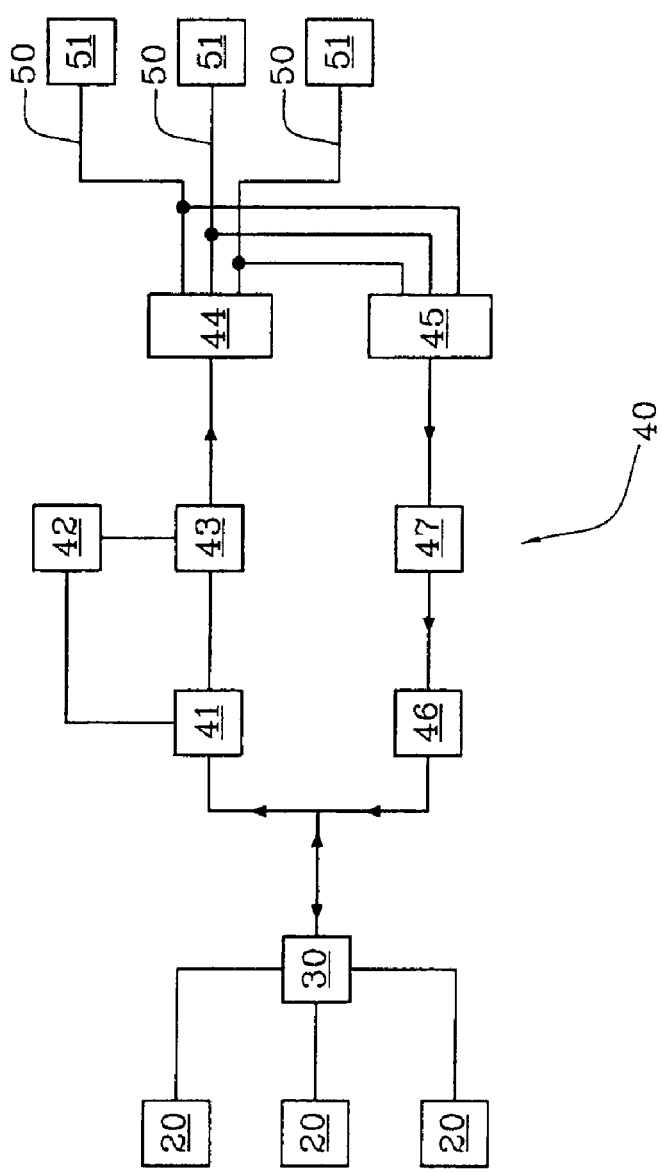
FIG. 2 is a block diagram of a processing unit of the system shown in FIG. 1.

With reference to the drawings, a system for control of apparatuses, in particular industrial apparatuses, in accordance with the present invention has been generally identified with reference numeral 1.

System 1 first of all comprises a plurality of interfaces 20, each of which is associated with a respective apparatus 10 to be controlled and allows a connection with this apparatus.

System 1 further comprises a processing unit 40, operatively associated with interfaces 20 for control of apparatuses 10.

For instance, the processing unit 40 can be connected to the interfaces 20 through a telematic network 30 which can be in particular the Internet, or it can use the GPRS or GSM protocols.

Preferably, each interface 20 has a local positioning with respect to apparatus 10 with which it is associated (i.e. it is positioned in close proximity thereto); more specifically the interface 20 can be mounted on apparatus 10.

Said apparatuses 10 can not only consist of industrial machinery, but they can also be automatic vending machines for food and/or drinks, motor-vehicles, automatic dispensers of medicaments, apparatuses for delivery of water, electric energy or gas in houses or offices, and any other type of apparatus/machine that is adapted for automatic control.

The task of the processing unit 40 is to control communication between the apparatuses 10 and the remote operators that, although not in the vicinity of apparatuses 10, are put in a position to monitor and regulate operation of the apparatuses themselves, possibly facing up to situations of failure or anomalies.

Therefore the processing unit 40 comprises first receiving means 41 to receive at least one data item from at least one predetermined apparatus 10; this data item is preferably representative of the operating conditions of said predetermined apparatus 10.

In particular, the data transmitted from the predetermined apparatus 10 can contain an identification code for said apparatus, together with an identification parameter for the type of failure or anomaly that has occurred. The data transmitted from apparatus 10 can also contain, more simply, an operating parameter detected by a sensor of apparatus 10, and optionally an identification code to identify the sensor that has carried out said detection.

The processing unit 40 further comprises a first selection block 42 operatively associated with the first receiving means 41 to select one or more addressees depending on the received data.

Practically, depending on the apparatus 10 from which the data comes, and the type of information contained therein, the first selection block 42 selects one or more operators to whom a notification signal is to be sent.

For instance, should an apparatus 10 have a mechanical problem inhibiting correct operation of same, the first selection block 42 gives notice of this situation to an operator responsible for mechanical repairs; should apparatus 10 have a too high and unexpected electric energy consumption, the first selection block 42 gives notice of this situation to an operator charged with repairs of the electric components present on the machine.

Generally, the addressees to which the processing unit 10 can send notification signals can comprise operators in charge of servicing or repairs, or high-grade operators to whom decisions concerning management are delegated, etc.

Alternatively, or in addition to the above, the processing unit 40 comprises a second selection block 43 to select one or more communication channels 50 for connection with one or more addressees.

Should the first and second selection blocks 42, 43 be both present in system 1, the communication channels 50 selected by the second selection block 43 will preferably be oriented to communication with the addressees selected by the first selection block 42.

The possible communication channels 50 among which the second selection block 43 can choose are a channel for telephone communication in voice, a facsimile transmission, an E-mail transmission, communications on a telephone network through SMS and/or MMS, etc.

It is to be pointed out that each communication channel 50 is associated with a respective notification device 51, to enable said notification device to give notice to the addressee operator.

Practically, the notification devices may include (fixed and mobile) telephones, facsimile devices, PC, PDA, etc. and any other type of device through which the operators can carry out interfacing with system 1; these notification devices 51 are sometimes referred to as "Human Interfaces".

Preferably each communication channel 50 is associated with a different "human interface" 51.

At the moment an addressee operator is selected by the first selection block 42, also a "virtual" address (telephone and facsimile address, E-mail address, etc.) is automatically retrieved in a suitably provided storage register so that this addressee can be reached by means of one or more of said notification devices 51.

The processing unit 40 further comprises first transmission means 44, operatively associated with the first and/or second selection blocks 42, 43 to send at least one notification signal by means of the channel/channels selected by the second selection block 43 to the addressee/addressees preferably selected by the first selection block 42.

The contents of this notification signal clearly are a function of the data coming from the predetermined apparatus 10.

It is to be pointed out that the selection carried out by the second selection block 43 can be performed depending on the data received through the first receiving means 41, and/or on the addressee/addressees selected by the first selection block 42. In other words, the communication channels 50 that are used each time can depend both on the type of information to be transmitted (e.g., for particularly urgent matters a direct telephone call will be used, while for less urgent matters a facsimile or an E-mail that are not necessarily immediately read by the addressee could be sufficient), and on the selected addressee (e.g., as far as operators are concerned who are not usually inside the office or the shed, use of the mobile (cordless) telephone network will be preferred).

As above said, among the possible communication channels 50 a voice communication channel can be taken into consideration; this type of communication is particularly useful either in case of urgent communications or in the event of operators that usually are hardly reachable with other communication channels.

In this case, following coming of data from apparatus 10, the processing unit 40 activates a telephone communication with the addressee, during which a voice (a recorded or synthesised voice, for example) gives the selected operator the information relative to said data, enabling the operator himself/herself to subsequently send commands in voice, during the same telephone communication, for regulation of apparatus 10.

Generally, therefore, the notification signal and subsequent response signal can be transmitted/received on a single telephone communication.

The processing unit 40 is further provided with second receiving means 45 to receive at least said response signal from the contacted operator.

Second transmission means 46 sends the response signal to the interface 20, so that said signal can reach apparatus 10 and regulate the same depending on the operator's statements. In fact, the response signal can incorporate a command or an adjustment for apparatus 10, for example.

In a preferred embodiment, the processing unit 40 further comprises an intermediate block 47 operatively interposed between the second receiving means 45 and second transmission means 46.

The intermediate block 47 makes the response signal suitable for transmission through the second transmission means 46; in particular, the intermediate block 47 is provided for conversion from voice signal into electric signal, should the response signal from the operator be of the voice type.

In particular, the intermediate block 47 can be able to convert the response signal originated from the operator into a signal adapted to be interpreted by the interface 20 and/or apparatus 10, so as to enable the operator's statements to be carried into effect.

Advantageously, for at least one of the addressees selected by the first selection block 42, the second selection block 43 selects a plurality of communication channels 50. In this manner, the addressee can be reached in different ways, depending on the type of information communicated, for example.

By way of example, let us consider the event that an electronic report containing a series of detailed information on an operation cycle of apparatus 1 is to be transmitted to a predetermined operator. Obviously, this report cannot be transmitted through a communication in voice, due to the high amount of information to communicate. Therefore, through a communication in voice the addressee can be informed that the report has been provided, while through facsimile or E-mail transmission the full contents of this report can be sent.

Generally, it is therefore provided that a first notification signal be sent to the addressee through a first communication channel 50 (e.g. notification that the report has been sent), while a second notification signal is sent, preferably simultaneously, to the same addressee through a second communication channel different from the first one.

Another situation in which sending of the notification signal through a plurality of channels 50 can be useful is that in which the communication channel 50 currently available for the addressee is not known in a precise manner.

Therefore, using more than one channel 50 makes it possible to have a reasonable certitude that the addressee has become acquainted with the notification signal within an acceptable time.

Preferably, the notification signal is sent to the addressee simultaneously on each of the selected channels 50, so as to make transmission quick and efficient.

In the light of the above, it is therefore apparent that there is the possibility both of sending the same notification signal to the same addressee through several different channels and of sending at least two distinct, but mutually connected, notification signals to the same addressee, each signal being sent on a respective communication channel 50.

A further function that can be performed by the second selection block 43 can consist in a plurality of communication attempts subsequent in time, with at least one different communication channel for each attempt, for contacting a given addressee.

In particular, the second selection block 43 can carry out a first communication attempt to contact such a given addressee and, should the first attempt be unsuccessful, make a second attempt using a communication channel different from the one used for the first attempt.

Should the second attempt too be not successful, the second selection block 43 can make a third attempt with a communication channel different from the two first channels, and so on.

It is to be noted that, while reference has been particularly made to situations of malfunction or anomalies in apparatus 10, the notification signal sent to the selected addressee/addressees can also concern situations of normal control and setting up of the operating steps carried out by the apparatus 10 itself.

As above said, associated with each apparatus 10 is an interface 20 enabling control and adjustment of the apparatus 10 itself.

The interface 20 comprises a series connection module and a parallel connection module. The series connection module is used to send and/or receive serial data, while the parallel connection module is used to send and/or receive parallel data.

It is also important to point out that in the present specification the different functional blocks present in system 1 have been represented as above stated for clearness of exposition; actually, the processing unit 40 can be made with a single electronic device, which is suitably adapted and/or programmed for performing the described functions.

Apparatus 10, in addition to actuators 11 and sensors 12, may comprise a local controller 13 to control operation of said actuators 11 and sensors 12, and a connecting interface 14 to be operatively associated with said interface 20.

In more detail, the connecting interface 14 is provided with a series connection module 15 and a parallel connection module 16.

The series connection module 15 is used to send and/or receive serial data, while the parallel connection module 16 is used to send and/or receive parallel data.

Through modules 15, 16, different information even if mutually linked together are sent and/or received. The local controller 13 is suitably programmed for handling of the information received and to be sent through the connecting interface 14.

The local controller 13 can be associated with a memory 13a into which a plurality of reference identification parameters are stored; each of these parameters is associated, in said memory, with one or more actions that must be started in a given situation.

The invention achieves important advantages.

First of all, the system allows a quick and efficient transmission between each monitored apparatus and the operators in charge that are contacted in the different situations that may occur.

This communication, due to the modes for obtaining it, allows a wide adaptability and flexibility of use to the control techniques employed.

In addition, due to the structure of the interface 20 interposed between the apparatus 10 and remote computer 40, it is possible to optimise the transmission velocity/manufacture complexity ratio of the interface itself, while at the same time maintaining the production and assembling costs very reduced.

A further advantage resides in the simplification of understanding and interpretation of the transmitted data, because the amount of information passing through each (serial and parallel) port is greatly reduced.

In addition to the above, by reducing the amount of data transmitted on each port, it is simultaneously reduced the number of possible errors during transmission/reception.

The invention claimed is:

1. A system for control of apparatuses, in particular industrial apparatuses, comprising:
    a plurality of interfaces (20), each dedicated to a connection with a respective apparatus (10) to be controlled;
    a processing unit (40) operatively associated with said interfaces (20) to control said apparatuses (10), said processing unit (40) being provided with:
    first receiving means (41) to receive at least one data item from one of said apparatuses (10);
    a first selection block (42) to select one or more addressees, depending on said data item received;
    first transmission means (44), to send at least one notification signal representative of said received data item to said one or more selected addressees,
    wherein said processing unit (40) comprises:
        second receiving means (45) to receive respective response signals to said notification signal from said one or more addressees;
        second transmission means (46) to send said response signals to said interface (20),
    wherein said response signal incorporates a command or an adjustment for said apparatus (10),
    wherein said response signal is a voice signal,
    wherein said processing unit (40) further comprises an intermediate block (47) provided for conversion from voice signal into electric signal adapted to be interpreted by the interface (20) and/or apparatus (10) to enable the operator's command to be automatically carried into effect.

2. A system as claimed in claim 1, wherein said processing unit further comprises a second selection block (43) to select one or more communication channels (50) for connection with one or more of said addressees.

3. A system as claimed in claim 2, wherein second selection block (43) carries out a selection of said communication channels (50), depending on said received data.

4. A system as claimed in claim 2, wherein said second selection block (43) carries out a selection of said communication channels (50) depending on the addressee/addressees of said notification signal.

5. A system as claimed in claim 2, characterised in that for at least one of said addressees selected by said first selection block (42), said second selection block (43) selects a plurality of communication channels (50).

6. A system as claimed in claim 1, wherein said communication channels (50) comprise a voice communication channel.

7. A system as claimed in claim 1, wherein said notification signal and response signal are transmitted on a single telephone communication between the addressee and the processing unit (40).

8. A system for control of apparatuses, in particular industrial apparatuses, comprising:
- a plurality of interfaces (20), each dedicated to a connection with a respective apparatus (10) to be controlled;
- a processing unit (40) operatively associated with said interfaces (20) to control said apparatuses (10), said processing unit (40) being provided with:
- first receiving means (41) to receive at least one data item from one of said apparatuses (10);
- a second selection block (43) to select one or more communication channels (50), for connection with said addressees;
- first transmission means (44), to send at least one notification signal representative of said received data item to said one or more addressees through the selected communication channel/channels,
- wherein said processing unit (40) comprises:
- second receiving means (45) to receive respective response signals to said notification signal from said one or more addressees;
- second transmission means (46) to send said response signals to said interface (20),
- wherein said response signal incorporates a command or an adjustment for said apparatus (10),
- wherein said response signal is a voice signal,
- wherein said processing unit (40) further comprises an intermediate block (47) provided for conversion from voice signal into electric signal adapted to be interpreted by the interface (20) and/or apparatus (10) to enable the operator's command to be automatically carried into effect.

9. A system as claimed in claim 8, wherein said processing unit further comprises a first selection block (42) to select one or more addressees for sending of said notification signal.

10. A system as claimed in claim 8, wherein said second selection block (43) carries out a selection of said communication channels (50) depending on said received data.

11. A system as claimed in claim 8, wherein said second selection block (43) carries out a selection of said communication channels (50) depending on the addressee/addressees of said notification signal.

12. A system as claimed in claim 8, wherein said communication channels (50) comprise a voice communication channel.

13. A system as claimed in claim 8, wherein said notification signal and response signal are transmitted on a single telephone communication between the addressee and the processing unit (40).

14. A system as claimed in claim 8, wherein for at least one of the addressees selected by said first selection block (42), said second selection block (43) selects a plurality of communication channels (50).

* * * * *